United States Patent [19]
Tucker et al.

[11] Patent Number: 5,546,398
[45] Date of Patent: Aug. 13, 1996

[54] SIGNAL INTERCEPT SYSTEM AND METHOD

[75] Inventors: Michel H. Tucker; Gary Sams; Kathleen Hennessey; Ramakhrisna Pattikonda; Mario Condit, all of Lubbock, Tex.

[73] Assignee: NTS Communications, Inc., Lubbock, Tex.

[21] Appl. No.: 96,665

[22] Filed: Jul. 23, 1993

[51] Int. Cl.⁶ ........................................................ H04J 3/12
[52] U.S. Cl. ........................ 370/94.1; 370/110.1; 379/207; 379/230
[58] Field of Search ............................ 379/112, 115, 379/230, 229, 201, 207; 370/110.1, 60, 85.13, 85.14, 68.1, 94.1

[56] References Cited

U.S. PATENT DOCUMENTS

| | | | |
|---|---|---|---|
| 4,162,377 | 7/1979 | Mearns | 379/230 |
| 4,310,727 | 1/1982 | Lawser | 379/207 |
| 4,685,127 | 8/1987 | Miller et al. | 379/112 |
| 5,008,929 | 4/1991 | Olsen et al. | 379/115 |
| 5,029,165 | 7/1991 | Choi et al. | 370/110.1 |
| 5,134,647 | 7/1992 | Pugh et al. | 379/230 |
| 5,181,238 | 1/1993 | Medamana et al. | 379/207 |
| 5,247,571 | 9/1993 | Kay et al. | 379/112 |
| 5,255,315 | 10/1993 | Bushnell | 379/230 |

*Primary Examiner*—Wellington Chin
*Assistant Examiner*—Chau T. Nguyen
*Attorney, Agent, or Firm*—H. Dennis Kelly; W. Thomas Timmons; Timmons & Kelly

[57] ABSTRACT

A signal intercept system intercepts an international calling frame, modifies a specific set of bits and then retransmits the frame in real time. The signal intercept system includes a communications processor and a signalling link interface. In one arrangement, the signalling link interface includes two intercept and transmit connectors and a coprocessor connector. In one arrangement, the communications processor includes a computer and a communications coprocessor. The computer maintains a data base with tables of such data as invalid calling card numbers. A computer program initializes and starts the communications coprocessor which handles high speed signal capture, manipulation and high speed signal retransmission. The communications coprocessor also interacts with the computer's data base to alter table parameters.

11 Claims, 7 Drawing Sheets

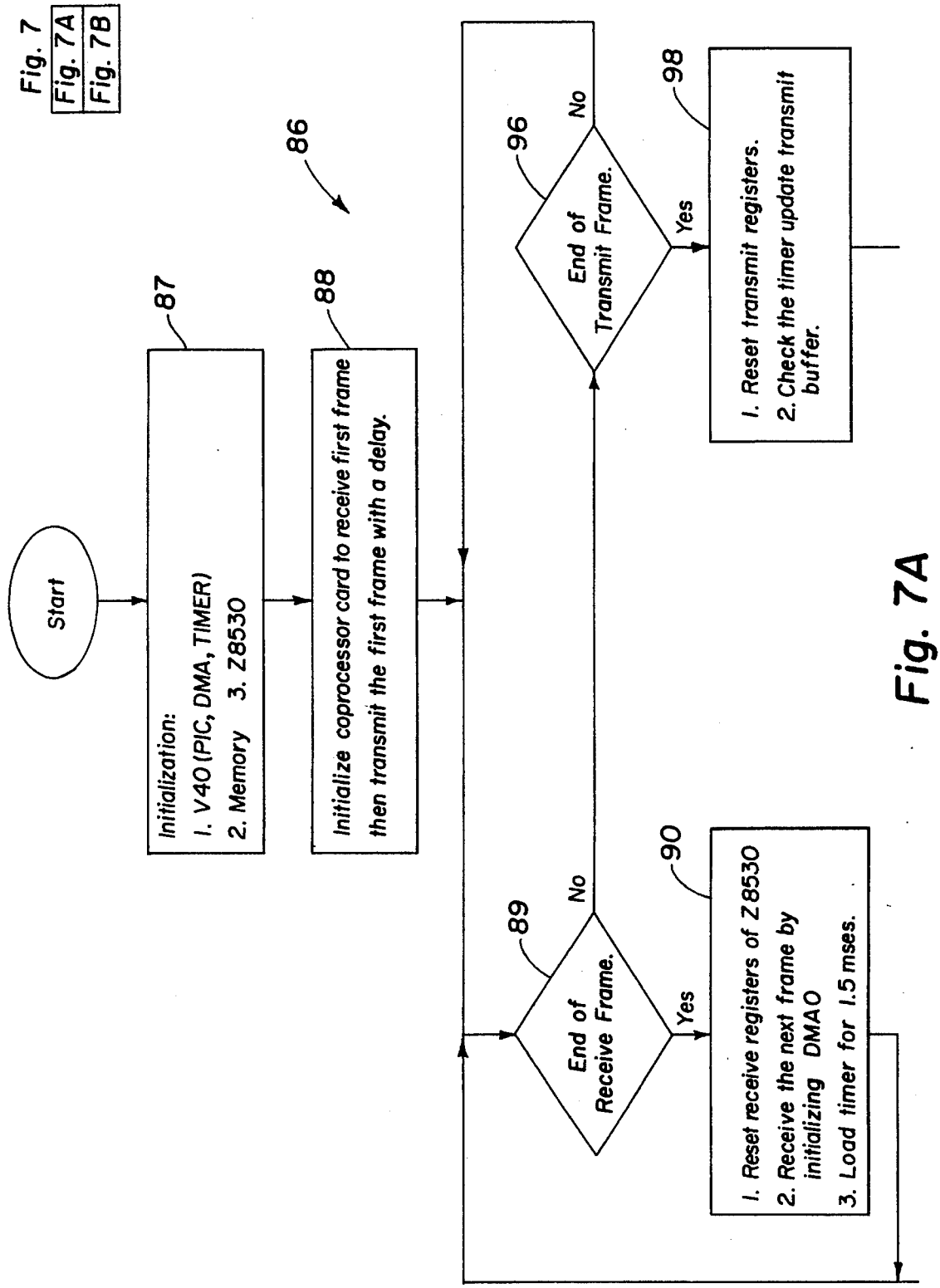

ced form the communications coprocessor onto the signalling link to the second signal point, with intercepting signals transmitted in both the directions or in either direction. For a signal intercept system of limited flexibility the desk top computer can be replaced with a module containing a micro processor, a communications coprocessor, and a floppy disk drive. In another arrangement, the computer and communications coprocessor can be replaced with a single smart communications processor.

SIGNAL INTERCEPT SYSTEM AND METHOD

BACKGROUND OF THE INVENTION

1. Field of the Invention

The present invention relates generally to communications systems and, in particular, to telephone systems. Fraudulent long distance calls have caused multi-billion dollar losses for telephone companies. Many of the fraudulent calls have recognizable patterns which could be detected and controlled if it were possible to intercept the calling information "on the fly". Similarly, if it were possible to catch signal directing information on the fly, then long distance calls could be rerouted when there is a problem with the telephone interchange as originally routed. This rerouting also provides flexibility to the carrier in choosing the routes for their calls.

2. Description of Related Art

In order for a calling party to place a telephone call to a called party, signalling is used to tell the called party that the calling party wishes to communicate. A recent method used to signal across telecommunications networks is known as "Signalling System 7" (SS7) has been standardized by the International Telegraph and Telephone Consultative Committee. Unlike previous technologies which used the same transmission path for the telephone conversation and for signalling across a network to the called party, known as "in-band signalling," SS7 uses separate dedicated transmission paths (SS7 links) to pass all of the required signalling information across the telecommunications network, known as "out-of-band signalling." Imbedded in the data that is sent over these SS7 links is addressing information such as calling party number, called party number, credit card number, originating switch ID, terminating switch ID and routing information among other parameters. Each network device the data passes through is addressed within the data stream and may or may not be modified or additional information inserted into the data packet as it traverses the network.

Signal transfer point (STP) switches can have signal intercept capabilities built-in as can other switches with international transfer capabilities. Such STPs are very expensive and having built-in capabilities only at the switches severely limits flexibility in handling calls. These problems also remain for all of the switches which do not have such built-in capabilities.

SUMMARY OF THE INVENTION

A signal intercept system according to the present invention is intended for installation in a data link. The installation of the signal intercept system between a first signal point and a second signal point does not cause addressing to change between the two points. The signal intercept system is transparent to the addressing hierarchy imbedded within the signalling protocol. Delays induced in the data packets between the first signal point and the second signal point are insignificant.

The signal intercept system includes a processor which can be provided in a desk top computer, a high performance workstation or server for processing data received in the form of signals, equipped with a communications coprocessor for data capture, a signalling link interface for intercepting signal transmitted from the first signalling point onto the signalling link and directing the intercepted signals to the communications coprocessor and transmitting signals received form the communications coprocessor onto the signalling link to the second signal point, with intercepting signals transmitted in both the directions or in either direction. For a signal intercept system of limited flexibility the desk top computer can be replaced with a module containing a micro processor, a communications coprocessor, and a floppy disk drive. In another arrangement, the computer and communications coprocessor can be replaced with a single smart communications processor.

In a preferred form, the signalling link interface includes a first connector for intercepting signals transmitted on the signalling link from the first signal point and transmitting signals received from communications coprocessor which had originated from second signal point, a coprocessor connector for directing the bi directional intercepted signals from the both connectors to the communications coprocessor, and a second connector for transmitting the signals received by the coprocessor connector from the communications coprocessor onto the signalling link to second signal point and to intercepting the signals transmitted on the signalling link from the second signal point.

A method according to the present invention for modifying selected data on a signalling link between a first signal point and a second signal point includes the steps of intercepting the data signals transmitted from the first signal point, converting the data signals into a form acceptable for computer processing, processing the converted data wherein selected data is modified, converting the modified data into data signals in a form acceptable by the signalling link and transmitting the converted modified data signals to the second point, where all of the above steps are carried out on signals transmitted in both directions, or in either direction, in high speed real time with less than a millisecond delay.

In the method according to the present invention for use in a telephone system using a SS7 protocol, the step of processing the converted data includes procedures for initializing all the registers of the processors with certain values for desired operation; initializing two separate buffers and direct memory accesses for transmit channels and receive channels; opening the channels for intercepting the signals and receive the receive frames to receive channel; transmitting the first frame with a desired delay; testing for end of receive frame, if the end of receive frame is detected, resetting receive registers and initializing receive channel to receive the next frame and then loading the timer for a predetermined amount; testing for the end of a transmit frame if the end of receive frame is not detected; if end of transmit frame is not detected then start the processing of the converted data; if the end of a transmit frame is detected then resetting the transmit registers 100; testing for timer expiry, initializing to transmit fill-in signal unit or link status signal unit if the timer has not expired and then starting over; if the timer has expired, initializing to transit message signal unit; testing if frame ended is an initial address message or a transaction capabilities applications part (TCAP) request; if the frame is not an initial address message or TCAP request, starting over; if the frame is an initial address message, getting the dialed digits; and then getting the gate number and other digits; looking up the database tables to see if the gate number has to be changed for rerouting purposes, if so getting the new gate number from the data base tables and then changing the gate number; and starting over; if the frame is a TCAP request component containing the calling card dialed digits information, storing the calling card number in calling card table and informing the main processor of the new calling card number, checking the exception calling card table to see if the current called card is a valid card; if so, make no changes. If the current called number is found in the exception table, reroute the request to a non-existent number or redirecting the related call to an operator; making the main processor periodically process the calling card table to recognize the patterns for invalid and/or other exception calls and store these calling numbers in the exception calling card table, starting over, adjusting the timing of the channels so that the information processing operation lies between the receive channel and transmit channel operations and none of the three operations conflict as they are operating simultaneously.

These and other objects, advantages and features of this invention will be apparent from the following description taken with reference to the accompanying drawing, wherein is shown a preferred embodiment of the invention.

BRIEF DESCRIPTION OF THE DRAWINGS

FIG. 7A and 7B are a flow diagram of a method according to the present invention for processing data from intercepted signals.

DESCRIPTION OF THE PREFERRED EMBODIMENT

Figure 1:
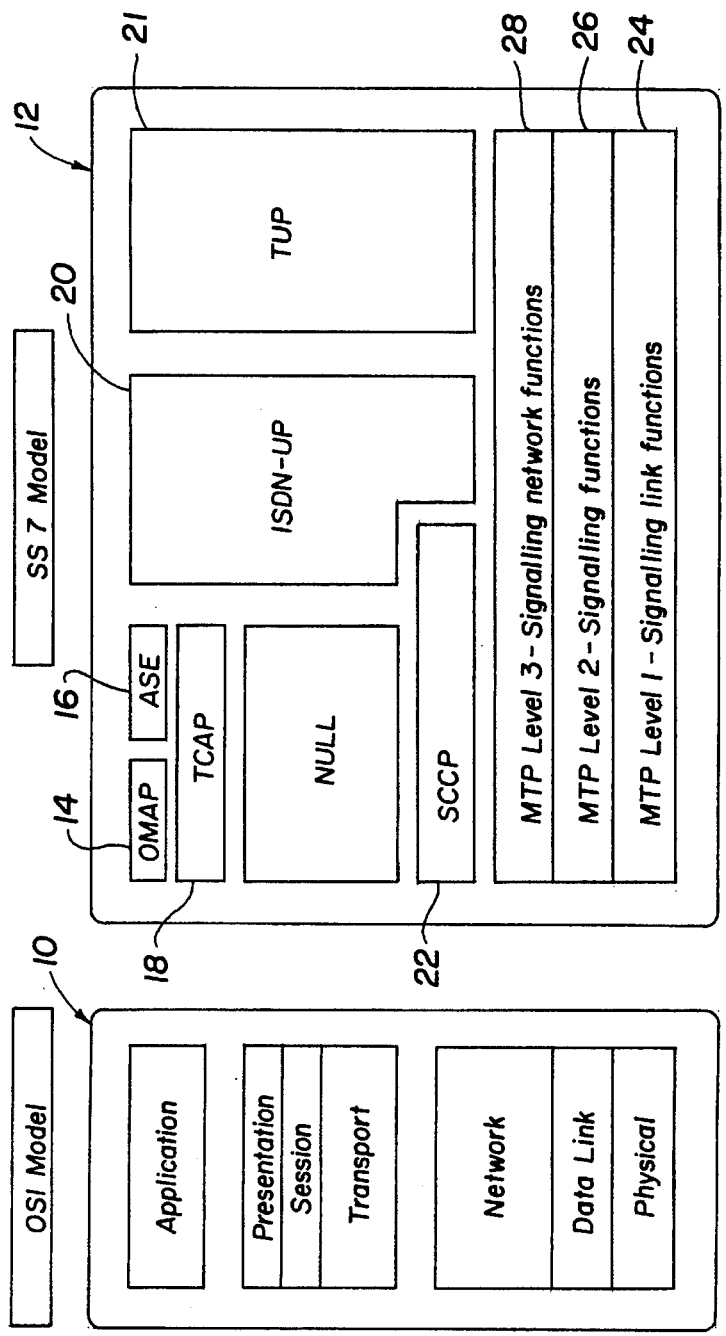
FIG. 1 is a diagrammatic representation of an Open Systems Interconnection model and a Signalling System 7 model.

Referring to the drawing, and in particular to FIG. 1, an open systems interconnection (OSI) model is designated by reference numeral 10, and a Signalling System 7 (SS7) model is designated by numeral 12. SS7 model 12 includes an Operation, Maintenance and Administrative Part (OMAP) 14, at least one Application Service Element (ASE) 16, a Transactions Capabilities Application Part (TCAP) 18, or an Integrated Services Digital Network - User Part (ISDN-UP) 20, or Telephone User Part (TUP) 21, and Signalling Connection Control Part (SCCP) 22 and three levels of Message Transfer Parts (MTPs) 24, 26 and 28 respectively.

Figure 2:
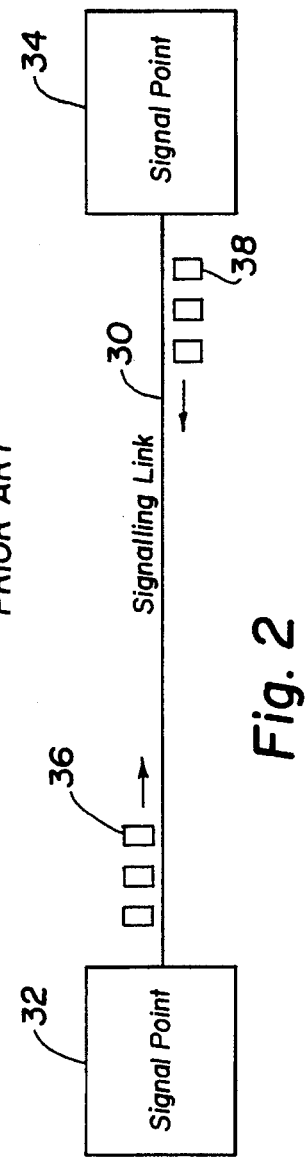
FIG. 2 is a block diagram representing transmission of signal messages along a signalling link.

Referring to FIG. 2, the second level MTP 26 handles the signalling link functions. The first level MTP 24 together with the second level MTP 26 provide a signalling link, 30, between two directly connected signalling points, 32 and 34. Signal messages, 36 and 38, are transferred over a signal link, 30, in variable length messages called "signal units". There are three types of signal units in the second level MTP 26, differentiated by the length indicator field contained in each message. The three types of messages are a message signal unit (MSU), a link status signal unit (LSSU) and fill in signal unit (FISU).

Figure 3:
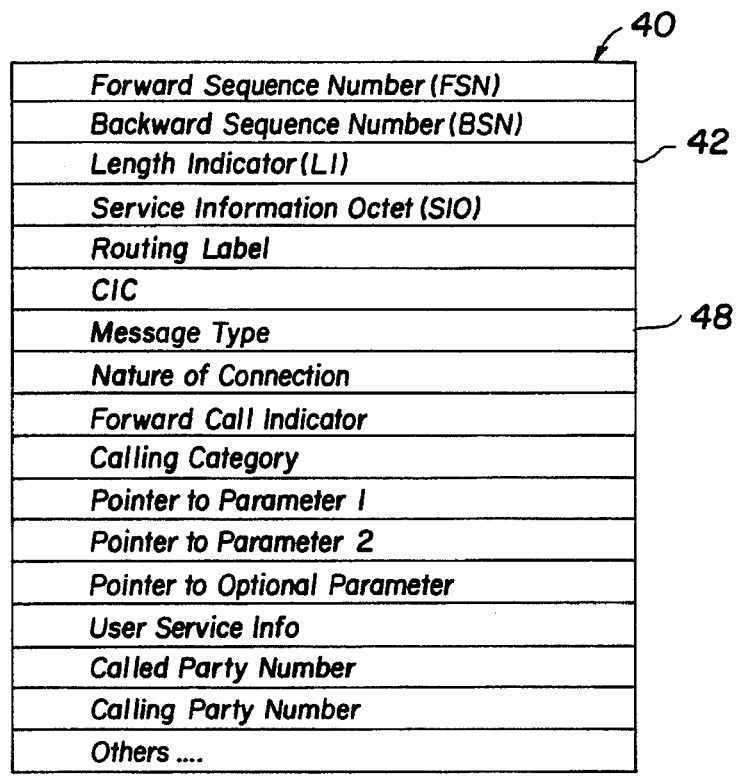
FIG. 3 is a diagrammatic representation of an Initial Address Message of one of the message signal units belonging to a Telephone User Part or ISDN-User Part.
Figure 4:
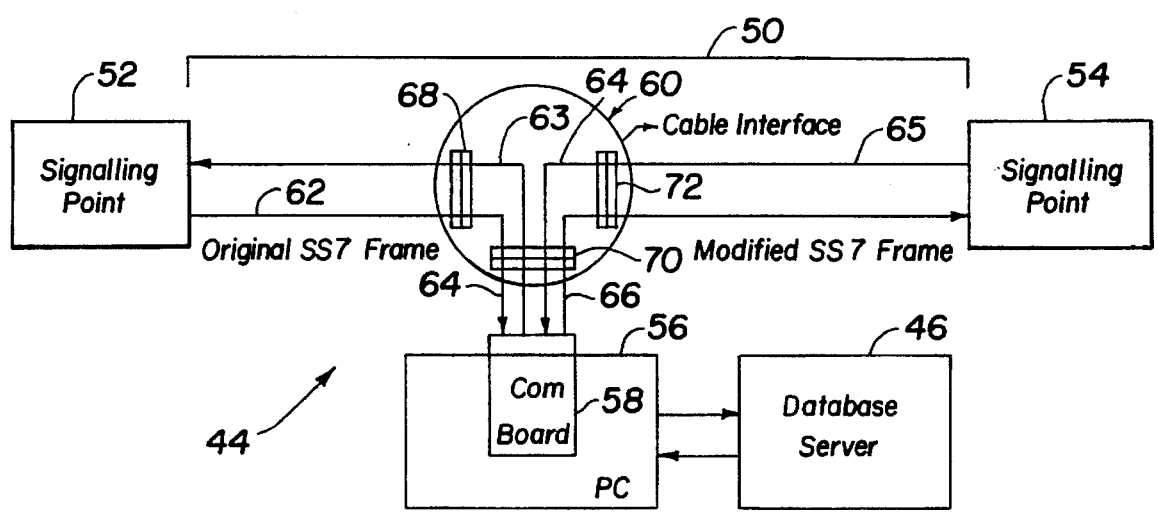
FIG. 4 is a block diagram representation of a signalling link and signal intercept system according to the present invention.

Referring now to FIG. 3 and FIG. 4, the data needed for rerouting a call is contained in an MSU called Initial Address Message (IAM) 40. MSU 40 is distinguished from the other signal units by length indicator 42. In one signal intercept system 44 according to present invention, a data base 46 includes data for rerouting different calls. The criteria which signal intercept system 44 uses to determine if it will change the routing of message include:

1. the frame must be an MSU,
2. the MSU must be IAM or TCAP request component,
3. the dialed digits contained in the IAM must have a corresponding value in the data base 46 or the TCAP request should contain the calling card information.

If the signal intercept system 44 determines that the message is an IAM or TCAP request, then it will process the message. Otherwise, the message is transmitted back to the SS7 link without changes. All other signal units, i.e. FISU and LSSU, are also transmitted back into the data stream without changes.

If the frame is an IAM such as message 40, then signal intercept system 44 processes that message. The method involves looking at different parts of IAM 40 to determine if the criteria for modification are met.

If the frame is a TCAP request containing calling card information, then the signal intercept system 44 processes the message. The method involves getting the calling card information from the frame and processing this information for exceptional calling card patterns.

Figure 5:
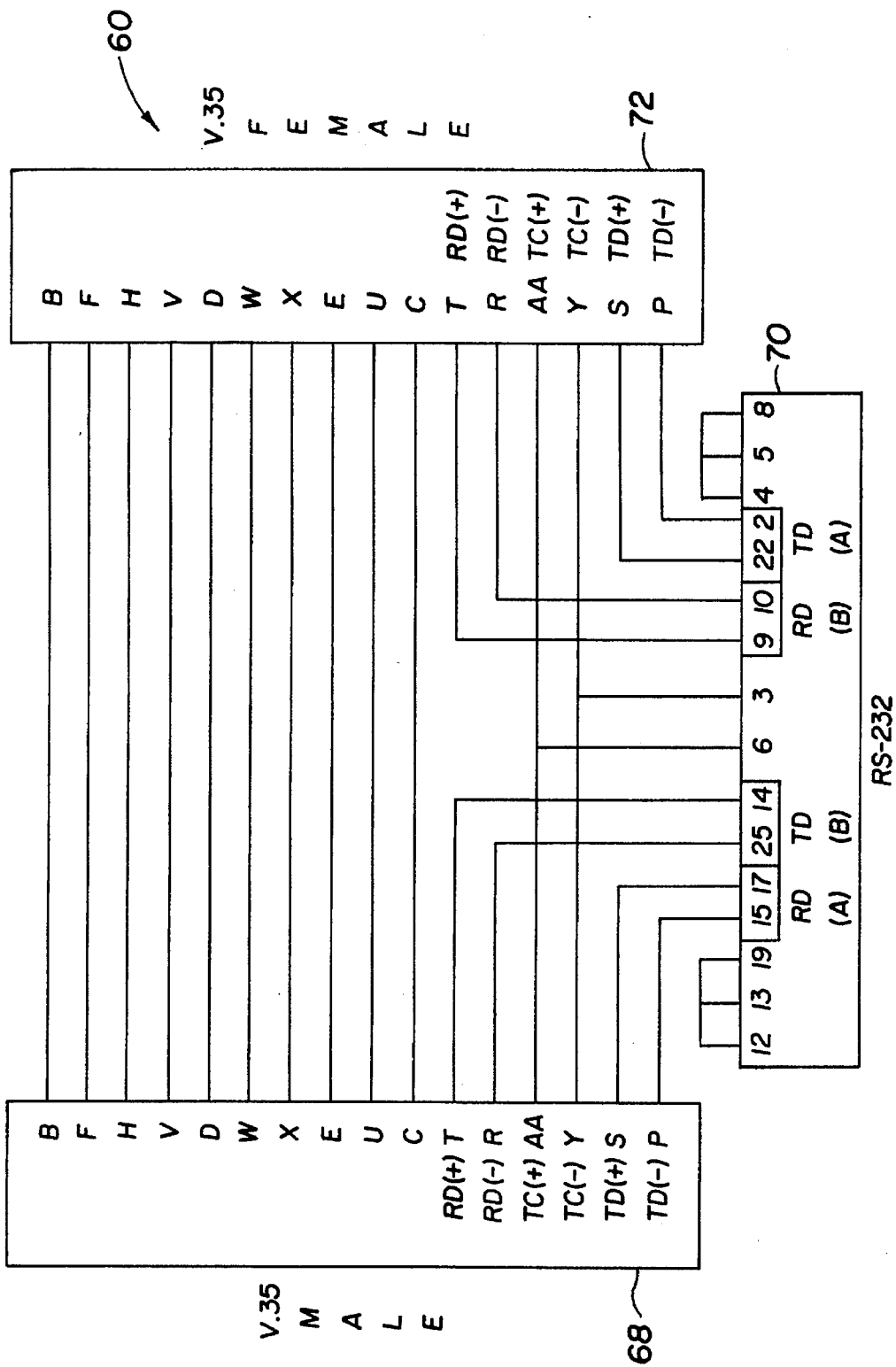
FIG. 5 is a signalling link interface according to the present invention for use with Signalling System 7 protocol.

Signal intercept system 44, for installation in a signalling link 50, between a first signal point such as local SS7 switch 52 and a second signal point such as remote SS7 switch 54, includes a computer 56, which can be an Intel 8086 based computer, for processing data received in the form of signals, a communications coprocessor 58 such as the synchronous coprocessor board having a Zilog 8530 communications controller and a V40 micro processor mounted within computer 56 full length expansion slot so that it is operably connected to the computer for high speed data capture and presentation of captured data in a form acceptable to the computer and converting data from the computer into high speed data in the form acceptable to the signalling link. It is, of course, possible to accomplish much of this with a high performance work station. Signal intercept system 44 also includes a signalling link interface, 60, shown in more detail in FIG. 5 for intercepting signals, 62, transmitted from the first signalling point, local switch 52, onto the signalling link and directing the intercepted signals, 64, to communications coprocessor 58 and transmitting signals 66 received from the communications coprocessor onto the signalling link to the second signal point, remote SS7 switch 54. With the same operation carried out in the opposite direction also.

Signalling link interface 60 includes a first connector, 68, for intercepting signals, 62, transmitted on the signalling link from the first signal point and transmitting signals, 63, received from communications coprocessor which had originated from second signal point, a coprocessor connector 70, for directing the intercepted signals, 64, from the two connectors to communications coprocessor 58 and for receiving signals from the communications coprocessor, and a record connector, 72, for transmitting signals, 66, received by the coprocessor connector from the communications coprocessor onto the signalling link to the second signal point and to intercept signals, 65, transmitted from the second signal point to communications coprocessor.

Figure 6:
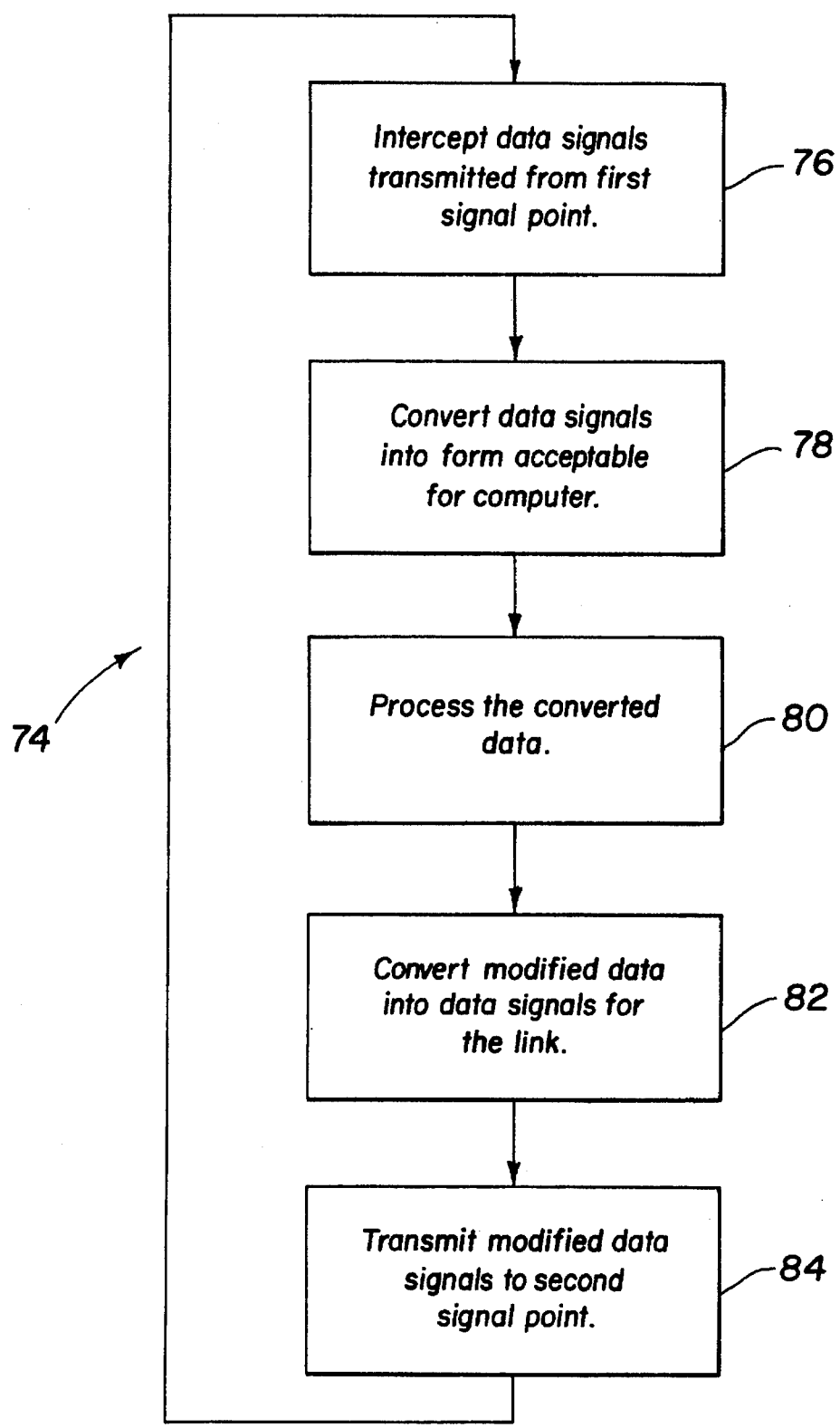
FIG. 6 is a flow diagram of the method according to the present invention for modifying selected data on a signalling link between a first signal point and a second signal point.

Referring to FIG. 6, one method according to the present invention for modifying selected data on a signalling link between a first signal point and a second signal point, is referred to by reference numeral 74. Method 74 includes a step, 76, of intercepting the data signals transmitted from the first signal point, step 78, of converting the data signals into a form acceptable for data processing, step 80, of processing the converted data wherein selected data is modified, step 82 of converting the modified data into data signals in a form acceptable by the signalling link, and step 84 of transmitting the converted modified data signals to the second signal point.

Figure 7B:
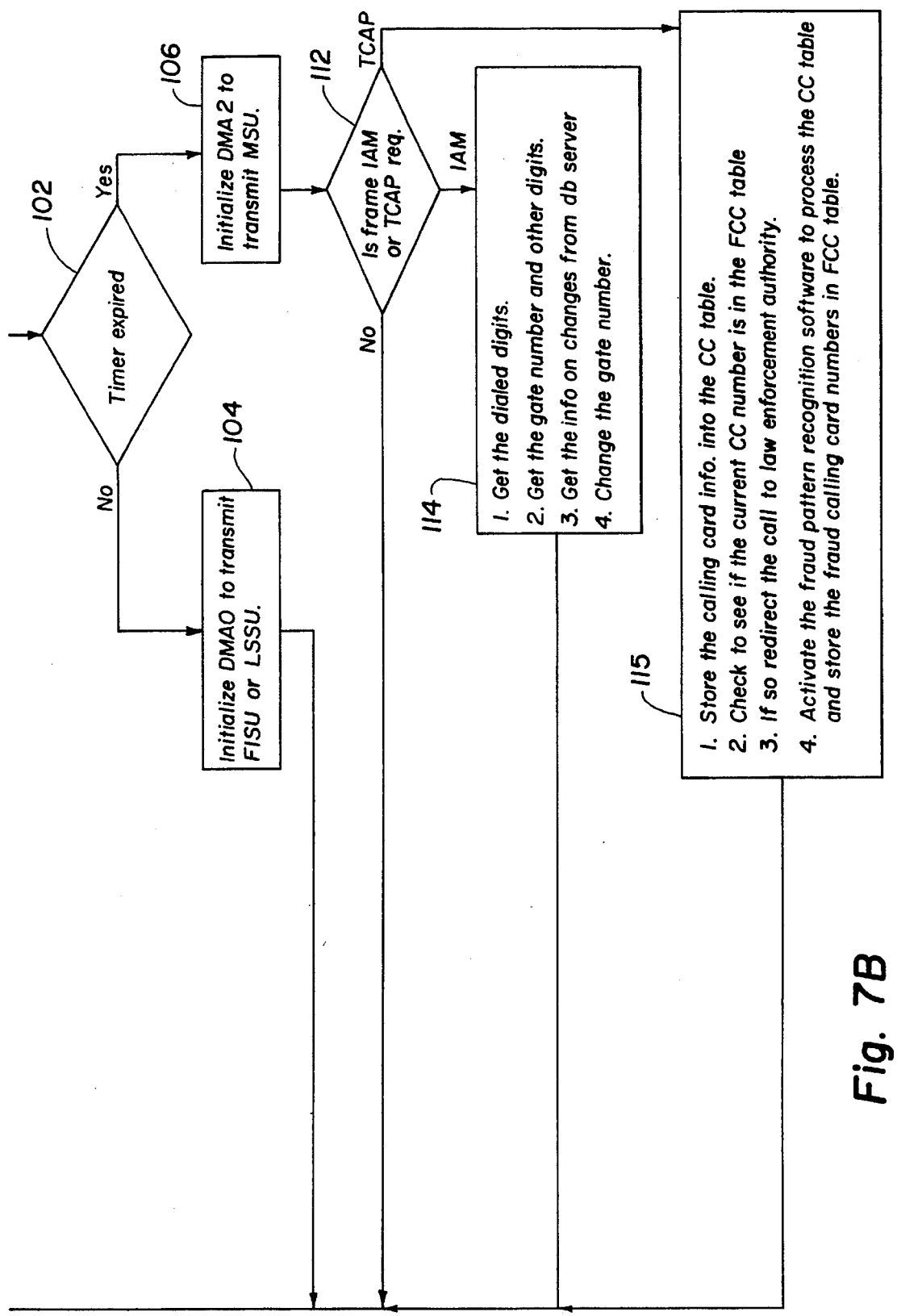
Figure 8:
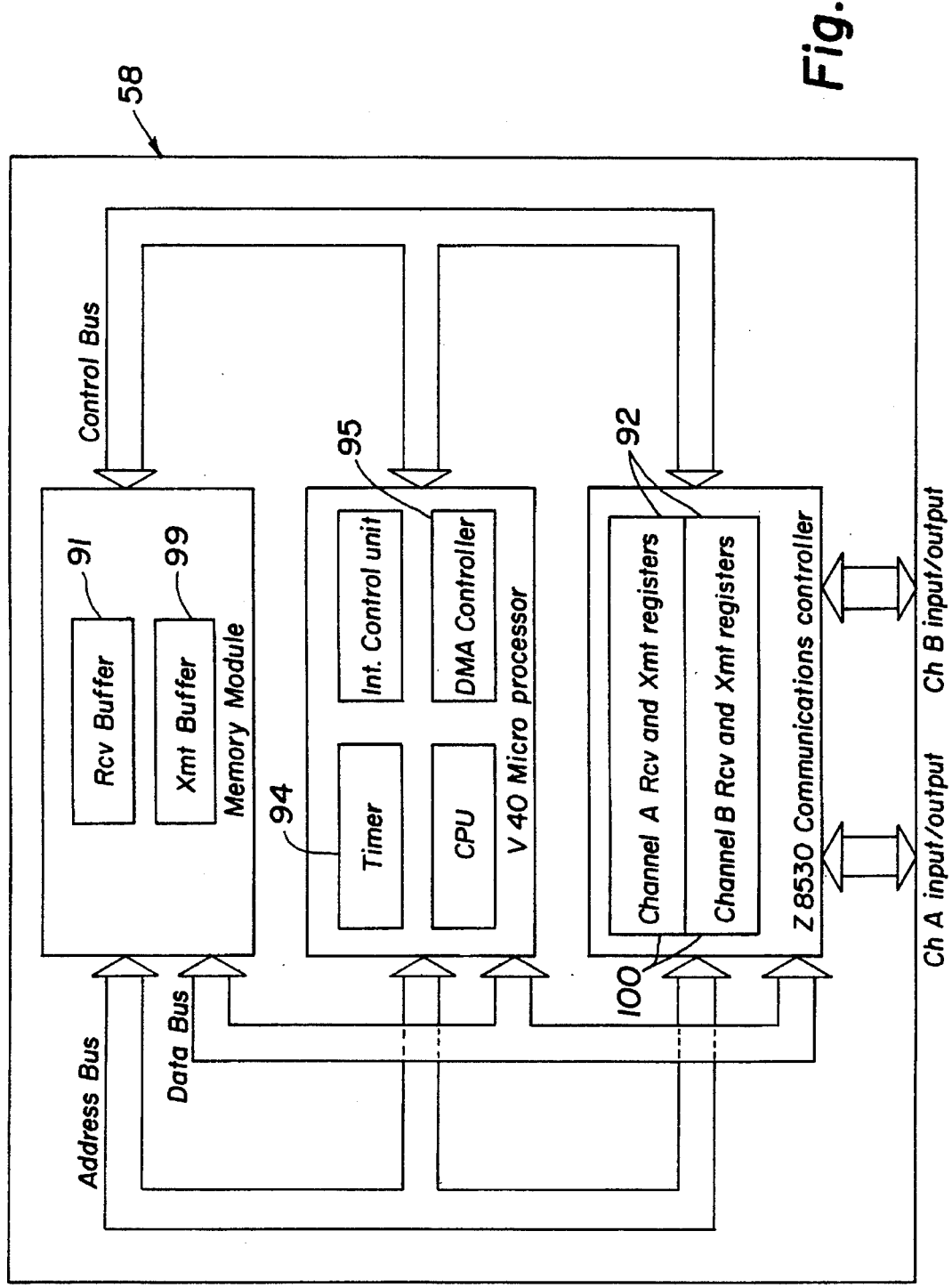
FIG. 8 is a block diagram representing the communications board used to intercept signals according to the present invention.

Referring to FIG. 7, a method according to the present invention for processing the converted data in a telephone system which uses a Signalling System 7 protocol is referred to generally by reference numeral 86. Method 86 includes a step 87, of initializing all the registers of V-40 and Z-8530 for desired operation of the processor; a step 88, of directing the first frame to receive buffer and transmitting the first frame with a desired delay; a step 89 of testing Z-8530 for the end of a receive frame; a step 90 condition of end of receive frame being detected, of resetting receive registers 92 in Z-8530, and then initializing Direct memory access 0 of V-40 to receive the next frame, and loading the V-40s timer for predetermined amount of time, depending on the delay requirements. If the end of the receive frame is not detected, step 96, testing Z-8530 for end of transmit frame, is followed by step 89 testing for the end of receive frame again, if the end of transmit frame is not critical. If the end of a transmit frame is detected, step 98 resets transmit registers in Z-8530, and is followed by step 102, testing if computer timer 94 has expired. If the timer has not expired, step 104 initializes direct memory access 2 (DMA2) 95 of V40 to transmit fill in signal unit from the transmit buffer 99 or link status signal unit from the transmit buffer 99; and then starts over. If the timer has expired, step 106 initializes direct memory access 2(DMA2) 95 of V40 to transmit the message signal unit from the receive buffer 91 and step 112 tests if the frame ended is an initial address message or TCAP request. If the frame is not an initial address message or TCAP request, the process starts over, but if the frame is an initial address message, step 114 gets the dialed digits, the gate number and other digits from the message signal unit, communicates with the database server to get the information on changes to be made to initial address message to reroute the call, and then changes the gate number and starts over, If the frame is a TCAP request containing calling card number information, the calling card number is recovered from the frame and is put in a main processor calling card table 115. The fraud calling card table is checked to see if the current calling card is a valid card. If the current card number is found to be a fraudulent card the request is voided by sending a non-existent calling card number for the request or the call related to this request is redirected to an operator or a law enforcement authority with the caller's identity information. The main processor periodically activates pattern recognition software to read the calling card number table so as to detect fraud patterns and put fraud calls in a fraudulent calling card table.

Although the signal intercept system and method may be used with a variety of communications physical links, logical links and protocols, SS7 has been used for purposes of illustration.

From the foregoing it will be seen that this invention is well adapted to attain all of the ends and objectives hereinabove set forth, together with other advantages which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the figures of the accompanying drawing is to be interpreted as illustrative and not in a limiting sense.

We claim:

1. A real time signal intercept system for installation in a signalling link between a first signal point which transmits first high speed data signals and a second signal point which would receive the first high speed data signals except they are intercepted by the signal intercept system, comprising in combination:

a computer which processes data received by the signal intercept system in the form of signals from the first signal point;

a communications coprocessor operably connected to the computer;

a signalling link interface which intercepts the first high speed data signals transmitted from the first signal point onto the signalling link and then directs the intercepted signals to the communications coprocessor and transmits processed first high speed data signals received from the communications coprocessor onto the signalling link to the second signal point, wherein the second signal point receives the processed first high speed data signals, and wherein the communications coprocessor captures the first high speed data signals received from the signalling link interface and presents captured first high speed data in a form acceptable to the computer, converts processed first high speed data from the computer into the processed first high speed data signals in a form acceptable to the signalling link and transmits the first high speed data signals to the signalling link interface.

2. A signal intercept system according to claim 1 wherein the signalling link interface comprises in combination:

an intercept connector which intercepts the first high speed data signals transmitted on the signalling link from the first signal point;

a coprocessor connector which directs the intercepted first high speed data, signals from the receive connector to the communications coprocessor and receives the processed first high speed data signals from the communications coprocessor; and a transmit connector which transmits the processed first high speed data signals received by the coprocessor connector from the communications coprocessor onto the signalling link to the second signal point.

3. A signal intercept system according to claim 1 wherein the signalling link interface also intercepts second high speed data signals transmitted from the second signal point onto the signalling link intended for the first signal point and directs the intercepted second high speed data signals to the communications coprocessor and transmits processed second high speed data signals received from the communications coprocessor onto the signalling link to the first signal point.

4. A signal intercept system for installation in a signalling link between a first signal point which transmits first high speed data signals and a second signal point which would receive the first high speed data signals except they are intercepted by the signal intercept system, comprising in combination:

a computer which processes data received by the signal intercept system in the form of signals from the first signal point;

a communications coprocessor operably connected to the computer;

a signalling link interface which intercepts the first high speed data signals transmitted from the first signal point onto the signalling link and then directs the intercepted signals to the communications coprocessor and transmits processed first high speed data signals received from the communications coprocessor onto the signalling link to the second signal point, wherein the second signal point receives the processed first high speed data signals, and wherein the communications coprocessor captures the first high speed data signals received from the signalling link interface and presents captured first high speed data in a form acceptable to the computer, converts processed first high speed data from the computer into the processed first high speed data signals in a form acceptable to the signalling link and transmits the first high speed data signals to the signalling link interface, and wherein the signalling link interface also intercepts second high speed data signals transmitted from the second signal point onto the signalling link intended for the first signal point and directs the intercepted second high speed data signals to the communications coprocessor and transmits processed second high speed data signals received from the communications coprocessor onto the signalling link to the first signal point, and wherein the signalling link interface comprises in combination:

a first connector which intercepts the first high speed data signals transmitted on the signaling link from the first signal point;

a second connector which intercepts the second high speed data signals transmitted on the signaling link from the second signal point; and a coprocessor connector which directs the intercepted first high speed data signals from the first connector and the second high speed data signals from the second connector to the communications coprocessor and for receiving the processed first high speed data signals and the processed second high speed data signals from the communications coprocessor;

wherein the first connector also transmits the processed second high speed data signals received by the coprocessor connector from the communications coprocessor onto the signalling link to the first signal point and the second connector transmits the processed first high speed data signals received by the coprocessor connector from the communications coprocessor onto the signalling link to the second signal point.

5. A method for modifying selected data transmitted as signals on a signaling link between a first signal point and a second signal point in real time, comprising in combination the steps of:

intercepting the data signals transmitted from the first signal point;

converting the intercepted selected data signals into data of a form acceptable for data processing;

processing converted selected data wherein the selected data is modified;

converting the modified selected data into data signals in a form acceptable by the signalling link; and transmitting the converted modified selected data signals along with any data signals which were not selected to the second signal point.

6. A method for modifying selected data transmitted as signals on a signaling link between a first signal point and a second signal point for use with a telephone system having dialed digits and gate numbers, which telephone system uses a Signalling System 7 protocol, comprising in combination the steps of:

intercepting the data signals transmitted from the first signal point;

converting intercepted selected data signals into data of a form acceptable for data processing;

processing the converted selected data wherein the selected data is modified;

converting the modified selected data into data signals in a form acceptable by the signalling link; and transmitting the converted modified selected data signals along with any data signals which were not selected to the second signal point, wherein the selected data is transmitted in packets consisting of frames, and the step of processing the converted selected data uses a communications controller and comprises in combination the steps of:

testing for an end of a receive frame;

if the end of a receive frame is detected, resetting the communications controller to receive the next frame; and then receiving the next frame;

begin timing for a predetermined amount of time;

if the end of the receive frame is not received, then testing for an end of a transmit frame;

if the end of a transmit frame is not detected, starting the step of processing converted data again;

if the end of a transmit frame is detected, resetting the communications controller for transmitting;

testing for expiry of the predetermined amount of time;

if the time has not expired, transmitting a fill-in status unit or a link status signal unit; and then starting over with testing for an end of a receive frame;

if the time has expired, transmitting a message signal unit;

testing if the frame ended is an initial address message;

if the frame is not an initial address message, then starting over with testing for an end of receipt of the selected data;

if the frame is an initial address message, getting the dialed digits; and then getting the gate number; and then changing the gate number; and starting over with testing for an end of a receive frame.

7. A method for modifying selected data transmitted as signals on a signaling link between a first signal point and a second signal point for use with a telephone system which a Signalling System 7 protocol, comprising in combination the steps of:

intercepting the data signals transmitted from the first signal point;

converting intercepted selected data signals into data of a form acceptable for data processing;

processing the converted selected data wherein the selected data is modified;

converting the modified selected data into data signals in a form acceptable by the signalling link; and transmitting the converted modified selected data signals along with any data signals which were not selected to the second signal point, wherein the selected data is transmitted in packets consisting of frames, wherein the step of processing the converted data uses a communications controller having Channel A receive and transmit registers, Channel B receive and transmit registers, a transmit buffer, a receive buffer and a direct memory access controller, and wherein the selected data is transmitted in packets consisting of frames, begun by a receive frame and ended with a transmit frame, the step comprising in combination the steps of:

initializing the receive and transmit registers with values for desired operation;

initializing two separate buffers and the direct memory access controller for transmit and receive channels;

opening the channels for intercepting the signals and receive the receive frame to receive channel;

transmitting the first frame with desired delay;

testing for end of receive frame;

if the end of receive frame is detected, resetting the receive registers;

initializing the receive channel to receive the next frame;

loading the timer with a predetermined amount of time;

if the end of receive frame is not detected, testing for end of transmit frame;

if end of transmit frame is not detected, starting the step of processing the converted data;

if the end of transmit frame is detected, resetting the transmit registers;

testing for timer expiry;

if the timer has not expired, initializing to transmit fill-in-signal-unit or link-status-signal unit and then starting over;

if the timer has expired, initializing to transmit message signal unit;

testing if the frame ended is an initial address message or TCAP request;

if the frame is not initial address message or TCAP request, starting over;

if the frame is an initial address message, getting the dialed digits the gate number and other digits, and looking up the database tables to see if the gate number has to be changed for rerouting purposes;

if so, getting the gate number from the database tables and then changing the gate number and starting over;

if the frame is a TCAP request component containing calling card dialed digits information, storing the calling card information in calling card table and informing the main processor of the new calling card number;

checking the exception calling card table to see if the current called card is a valid card;

if so, make no changes;

if the current called number is found in the exception table, voiding the request by changing the calling card number to a non-existent number or rerouting the related call to an operator or law enforcement authority;

making the main processor periodically process the calling card table to recognize the patterns for exception calls and store the exception calling numbers in the exception calling card table and starting over;

adjusting the timing of channels so that the information processing operation lies between the receive channel and transmit channel operation and none of these three operations conflict as they are operating simultaneously.

8. A real time signal intercept system for use with a computer and installation in a signalling link between a first signal point which transmits first high speed data signals and a second signal point which would receive the first high speed data signals except they are intercepted by the signal intercept system, comprising in combination:

a communications coprocessor operably connected to the computer;

a signalling link interface which intercepts the first high speed data signals transmitted from the first signal point onto the signalling link and then directs the intercepted signals to the communications coprocessor and transmits processed first high speed data signals received from the communications coprocessor onto the signalling link to the second signal point, wherein the second signal point receives the processed first high speed data signals, and wherein the communications coprocessor captures the first high speed data signals received from the signalling link interface and presents captured first high speed data in a form acceptable to the computer, converts processed first high speed data from the computer into the processed first high speed data signals in a form acceptable to the signalling link and transmits the first high speed data signals to the signalling link interface.

9. A signal intercept system according to claim 8 wherein the signalling link interface comprises in combination:

an intercept connector which intercepts the first high speed data signals transmitted on the signalling link from the first signal point;

a processor connector which directs the intercepted first high speed data signals from the receive connector to the communications processor and receives the processed first high speed data signals from the communications processor; and a transmit connector which transmits the processed first high speed data signals received by the processor connector from the communications processor onto the signalling link to the second signal point.

10. A signal intercept system according to claim 8 wherein the signalling link interface also intercepts second high speed data signals transmitted from the second signal point onto the signalling link intended for the first signal point and directs the intercepted second high speed data signals to the communications processor and transmits processed second high speed data signals received from the communications processor onto the signalling link to the first signal point.

11. A signal intercept system for use with a computer and installation in a signalling link between a first signal point which transmits first high speed data signals and a second signal point which would receive the first high speed data signals except they are intercepted by the signal intercept system, comprising in combination:

a communications coprocessor operably connected to the computer;

a signalling link interface which intercepts the first high speed data signals transmitted from the first signal point onto the signalling link and then directs intercepted signals to the communications coprocessor and transmits the processed first high speed data signals received from the communications coprocessor onto the signalling link to the second signal point, wherein the second signal point receives the processed first high speed data signals, and wherein the communications coprocessor captures the first high speed data signals received from the signalling link interface and presents captured first high speed data in a form acceptable to the computer, converts processed first high speed data from the computer into the processed first high speed data signals in a form acceptable to the signalling link and transmits the first high speed data signals to the signalling link interface, wherein the signalling link interface also intercepts second high speed data signals transmitted from the second signal point onto the signalling link intended for the first signal point and directs intercepted second high speed data signals to the communications processor and transmits processed second high speed data signals received from the communications processor onto the signalling link to the first signal point, and wherein the signalling link interface comprises in combination:

a first connector which intercepts the first high speed data signals transmitted on the signaling link from the first signal point;

a second connector which intercepts the second high speed data signals transmitted on the signaling link from the second signal point; and a processor connector which directs the intercepted first high speed data signals from the first connector and the second high speed data signals from the second connector to the communications processor and for receiving the processed first high speed data signals and the processed second high speed data signals from the communications processor;

wherein the first connector also transmits the processed second high speed data signals received by the processor connector from the communications processor onto the signalling link to the first signal point and the second connector transmits the processed first high speed data signals received by the processor connector from the communications processor onto the signalling link to the second signal point.

* * * * *